(12) United States Patent
Lopez-Perez et al.

(10) Patent No.: US 12,295,031 B2
(45) Date of Patent: May 6, 2025

(54) SPATIAL REUSE FOR WIRELESS NETWORK

(71) Applicant: Nokia Technologies Oy, Espoo (FI)

(72) Inventors: David Lopez-Perez, Blanchardstown (IE); Mika Kasslin, Espoo (FI); Lorenzo Galati Giordano, Blanchardstown (IE); Adrian Garcia Rodriguez, Santa Cruz de Tenerife (ES)

(73) Assignee: Nokia Technologies Oy, Espoo (FI)

( * ) Notice: Subject to any disclaimer, the term of this patent is extended or adjusted under 35 U.S.C. 154(b) by 696 days.

(21) Appl. No.: 17/270,800

(22) PCT Filed: Oct. 5, 2018

(86) PCT No.: PCT/FI2018/050715
§ 371 (c)(1),
(2) Date: Feb. 23, 2021

(87) PCT Pub. No.: WO2020/070372
PCT Pub. Date: Apr. 9, 2020

(65) Prior Publication Data
US 2021/0345401 A1 Nov. 4, 2021

(51) Int. Cl.
*H04W 74/0808* (2024.01)
*H04B 7/06* (2006.01)
*H04W 84/12* (2009.01)

(52) U.S. Cl.
CPC ....... *H04W 74/0808* (2013.01); *H04W 84/12* (2013.01); *H04B 7/0617* (2013.01)

(58) Field of Classification Search
None
See application file for complete search history.

(56) References Cited

U.S. PATENT DOCUMENTS

| | | | |
|---|---|---|---|
| 9,571,257 B2 * | 2/2017 | Kwon | H04W 74/0808 |
| 10,182,361 B1 * | 1/2019 | Moon | H04W 24/08 |
| 2006/0022815 A1 * | 2/2006 | Fischer | G06K 7/10356 340/505 |
| 2007/0297365 A1 * | 12/2007 | Li | H04W 4/12 455/456.1 |
| 2010/0309781 A1 * | 12/2010 | Wang | H04B 7/0871 375/267 |
| 2011/0281600 A1 * | 11/2011 | Tanaka | H04B 7/024 455/500 |

(Continued)

OTHER PUBLICATIONS

Office Action received for corresponding European Patent Application No. 18789461.3, dated Apr. 6, 2023, 4 pages.

(Continued)

*Primary Examiner* — Mariela Vidal Carpio
(74) *Attorney, Agent, or Firm* — McCarter & English LLP

(57) ABSTRACT

According to an example aspect of the present invention, there is provided a method, comprising: receiving from a first wireless device a first transmission comprising information on beamforming and/or null steering for a second transmission from the first wireless device, and controlling a third transmission from a second wireless device to a third wireless device during the second transmission on the basis of the information on beamforming and/or null steering.

20 Claims, 5 Drawing Sheets

(56) References Cited

U.S. PATENT DOCUMENTS

| | | | | |
|---|---|---|---|---|
| 2011/0286418 | A1* | 11/2011 | Liu | H04L 45/125 370/329 |
| 2012/0315938 | A1* | 12/2012 | Van Nee | H04B 7/0615 455/507 |
| 2013/0216002 | A1* | 8/2013 | Suh | H04L 5/0023 375/295 |
| 2015/0030094 | A1 | 1/2015 | Zhang | |
| 2016/0112107 | A1* | 4/2016 | Wang | H04W 74/0816 370/329 |
| 2016/0337056 | A1* | 11/2016 | Frenne | H04W 24/10 |
| 2016/0345278 | A1* | 11/2016 | Chu | H04W 56/001 |
| 2017/0142659 | A1* | 5/2017 | Noh | H04W 52/0229 |
| 2017/0294949 | A1* | 10/2017 | Zhang | H04W 52/46 |
| 2017/0325254 | A1* | 11/2017 | Zhou | H04W 72/52 |
| 2018/0343096 | A1* | 11/2018 | Kim | H04L 5/00 |
| 2019/0097695 | A1* | 3/2019 | Patwardhan | H04B 7/0456 |
| 2022/0302963 | A1* | 9/2022 | Garcia Rodriguez | H04B 7/0617 |

OTHER PUBLICATIONS

Cariou et al., "EXtreme Throughput (XT) 802.11", IEEE 802.11-18/0789r10, May 8, 2018, pp. 1-15.

Vermani et al., "16 Spatial Stream Support in Next Generation WLAN", IEEE 802.11-18/0818r3, May 7, 2018, pp. 1-11.

Yang et al., "Next Generation PHY/MAC in Sub-7GHz", IEEE 802.11-18/0846r2, May 10, 2018, pp. 1-21.

"Network Allocation Vector", Wikipedia, Retrieved on Feb. 23, 2021, Webpage available at : https://en.wikipedia.org/wiki/Network_allocation_vector.

Afaqui et al., "IEEE 802.11ax: Challenges and Requirements for Future High Efficiency WiFi", IEEE Wireless Communications, vol. 24, No. 3, Jun. 2017, pp. 130-137.

Qu et al., "Survey and Performance Evaluation of the Upcoming Next Generation WLAN Standard—IEEE 802.11ax", Networking and Internet Architecture, Jun. 15, 2018, 155 pages.

Asai et al., "Interference Management Using BeamformingTechnique in OBSS Environment", IEEE 802.11-10/0585r3, May 2010, pp. 1-13.

International Search Report and Written Opinion received for corresponding Patent Cooperation Treaty Application No. PCT/FI2018/050715, dated May 16, 2019, 13 pages.

Chen et al., "Discussions on the PHY features for EHT", IEEE 802.11-18/1461rl, Sep. 9, 2018, pp. 1-21.

Yang et al., "Considerations on AP Coordination", 802.11-18-1576-00-0eht, Sep. 8, 2018, pp. 1-17.

* cited by examiner

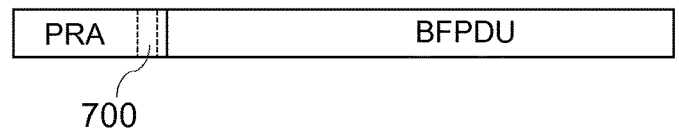
Fig. 7
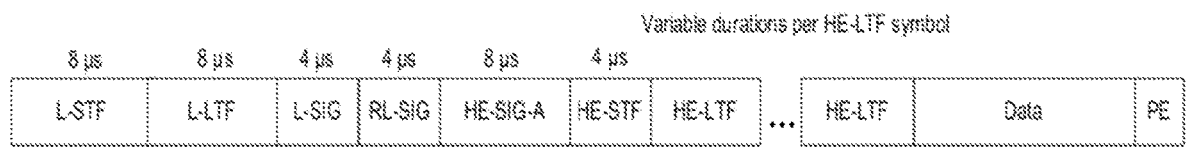
Fig. 8
| Value | Meaning |
|---|---|
| 0 | SRP_DISALLOW |
| 1-12 | Reserved |
| 13 | SR_RESTRICTED |
| 14 | SR_DELAY |
| 15 | SRP_AND_NON_SRG_OBSS_PD_PROHIBITED |
Fig. 9

SPATIAL REUSE FOR WIRELESS NETWORK

RELATED APPLICATION

This application was originally filed as PCT Application No. PCT/FI2018/050715 on Oct. 5, 2018 each of which is incorporated herein by reference in its entirety.

FIELD

Various example embodiments relate to wireless communications, and in particular to spatial reuse mechanisms for wireless networks.

BACKGROUND

Channel utilization is based on a single carrier frequency in many wireless networks, such as wireless local area networks. In case of shared channels, users tune on the same channel and try to transmit data. To avoid collisions, several techniques exist, such as the carrier sense multiple access (CSMA).

Spatial reuse enables to improve network capacity and algorithms have been studied and proposed for enabling spatial reuse. Directional antennas may be applied for mitigating co-channel interference. With the increasing number of wireless devices and networks, there are more overlapping networks, and transmissions causing interference to neighbouring networks. There is a demand to further develop and improve technologies facilitating spatial reuse.

SUMMARY

The invention is defined by the features of the independent claims. Some specific embodiments are defined in the dependent claims.

According to a first aspect of the present invention, there is provided a method, comprising: receiving from a first wireless device a first transmission comprising information on beamforming and/or null steering for a second transmission from the first wireless device, and controlling a third transmission from a second wireless device to a third wireless device during the second transmission on the basis of the information on beamforming and/or null steering.

According to a second aspect of the present invention, there is provided a method, comprising: sending, from a first wireless device to a second wireless device, a first transmission comprising information on beamforming and/or null steering for a second transmission from the first wireless device, for controlling a third transmission from the second wireless device to a third wireless device during the second transmission from the first wireless device.

There are also provided an apparatus comprising at least one processor, at least one memory including computer program code, the at least one memory and the computer program code being configured to, with the at least one processor, cause the apparatus at least to carry out features in accordance with the first and/or second aspect. According to still further aspects, there are provided a computer program and a computer-readable medium configured to carry out features in accordance with the first and/or second aspect. According to an aspect, there is provided an apparatus comprising means for causing the apparatus to carry out the method of any one of the method claims.

In an embodiment according to any one of the aspects, power or energy received during the first transmission and/or a first period of the second transmission is measured by the second wireless device. In response to the measured power not exceeding a threshold applied on the basis of the information on beamforming and/or null steering, the third transmission is enabled after the first period and during a second period of the second transmission. If the threshold is exceeded, the third transmission is disabled or prevented.

In an embodiment according to any one of the aspects, a number of null radiation nulls and/or at least one target and/or direction of at least one null radiation null is indicated during the second transmission in the information on beamforming and/or null steering.

BRIEF DESCRIPTION OF THE DRAWINGS

FIGS. 7 to 9 illustrate message formats communication resource usage examples in accordance with at least some embodiments.

EMBODIMENTS

Figure 1:
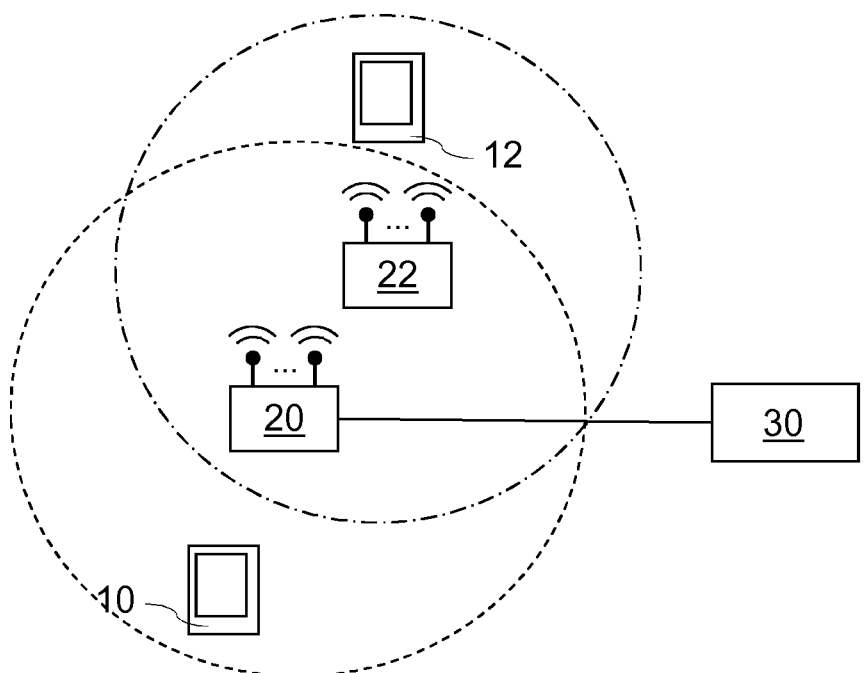
FIG. 1 illustrates a wireless communication system in which at least some embodiments may be applied.

FIG. 1 illustrates an example wireless communication system. The wireless communication devices (or wireless nodes) of FIG. 1 comprise stations (STA) 10, 12, 20, 22. In case of IEEE 802.11-based wireless local area networks (WLANs), the STA 20, 22 may be associated with a basic service set (BSS) which is a basic building block of IEEE 802.11-based WLANs. The most common BSS type is an infrastructure BSS that includes a single access point (AP) together with all STAs associated with the AP. The AP may be a fixed AP or a mobile AP.

The STAs, such as the STA 20 may also provide access to other networks, such as the Internet. In an embodiment, the plurality of BSSs may interconnect to form an extended service set (ESS). The STAs 20, 22 may be connected to other networks and further network elements 30, such as a network management system (NMS). The STAs 20, 22 may be multi-antenna devices and configured to utilize their spatial degrees of freedom for beamforming their transmitted signals and/or placing nulls towards coexisting devices.

In case of infrastructure BSS, e.g. STA 10 or 20 may be an AP, and STA 12 or 22 may be an AP. In some example embodiments, STAs 20 and 22 are APs and STAs 10 and 12 are non-AP stations, as further illustrated below. However, it is to be appreciated that it could be vice versa.

In WLANs the medium access control (MAC) layer communicates with the physical layer convergence protocol (PLCP) sublayer via primitives (a set of "instructive commands" or "fundamental instructions") through a service access point (SAP). When the MAC layer instructs it to do so, the PLCP prepares MAC protocol data units (MPDUs) for transmission. The PLCP minimizes the dependence of the MAC layer on the physical medium dependent (PMD) sublayer by mapping MPDUs into a frame format suitable for transmission by the PMD. The PLCP also delivers incoming frames from the wireless medium to the MAC layer. The PLCP appends a PHY-specific preamble and header fields to the MPDU that contain information needed by the physical layer transmitters and receivers. The 802.11 standard refers to this composite frame (the MPDU with an additional PLCP preamble and header) as a PLCP protocol data unit (PPDU).

Network allocation vector (NAV) is a virtual carrier-sensing mechanism used in wireless network protocols, such as IEEE 802.11 based systems, and is a logical abstraction that limits the need for physical carrier-sensing at the air interface to save power. The MAC layer frame headers contain a duration field that specifies the transmission time required for the communication. In addition, the PLCP header also carries information relevant for determining the duration of the frame being transmitted. Wireless devices listening to the wireless medium read this information and back off accordingly. For example, when a first AP 20, referred also to as AP1, wishes to send to a first STA 10, or STA1, it sends a request to send (RTS). When other wireless devices in the range, such as the second AP 22, or AP2 and a second STA 12, or STA2, detect the RTS, they set their NAV timers for the duration of the AP1 transmission as specified in the RTS.

In some embodiments, the carrier sense protocol may be provided with a plurality of NAVs, such as an intra-BSS NAV and an inter-BSS NAV. The STAs may be configured to apply an adaptive clear channel assignment (CCA) implementation that may raise signal detect (SD) threshold for inter-BSS frames, while maintaining a lower SD threshold for intra-BSS frames.

The intra-BSS NAV may be updated only on received frames that can be classified as intra-BSS frames. If a frame is classified as an inter-BSS frame or it cannot be classified, the inter-BSS NAV, also referred to as basic NAV, is updated with given conditions. If a wireless device does not support the two NAVs, all the frames received are used to update the basic NAV. If a wireless device has two NAVs implemented with the ability to classify frames as intra-BSS and inter-BSS frames, and can increase the inter-BSS SD threshold, such wireless device ends up considering the channel free more often than those devices without those capabilities, thus enabling enhanced spatial reuse.

The PLCP preamble is transmitted omnidirectionally in all directions of space. Thus, wireless devices in the omnidirectional coverage area of PLCP preamble transmitter read the PLCP preamble and back off.

There is now provided an improved solution facilitating to take further advantage of interference mitigation and resulting channel access opportunities provided by beamforming and/or null steering during subsequent data transmission, to further enhance spatial reuse.

Figure 2:
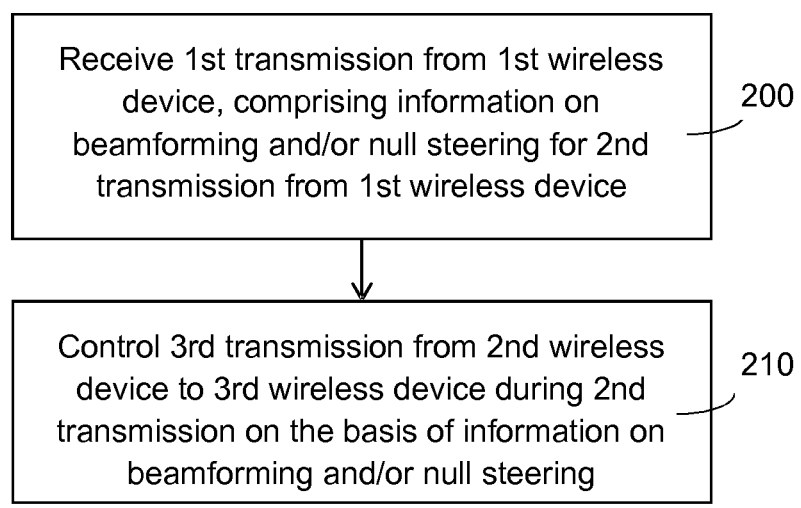
FIGS. 2 and 3 illustrate methods in accordance with at least some embodiments.

FIG. 2 illustrates a method for facilitating spatial reuse. The method may be performed in an apparatus controlling wireless transmission, such as the STA 10, the AP 22 or a controller thereof.

The method comprises, as performed by a 2nd wireless device: receiving 200 from a 1st wireless device a 1st transmission comprising information on beamforming and/or null steering for a 2nd transmission from the 1st wireless device, such as the AP1 20. Block 210 comprises controlling a 3rd transmission from a 2nd wireless device to a 3rd wireless device during the 2nd transmission on the basis of the information on beamforming and/or null steering. The information on beamforming and/or null steering refers generally to null steering and/or beamforming related information regarding a subsequent non-omnidirectional transmission applying beamforming and/or null steering. The information may indicate use of beamforming and/or null steering in the subsequent (2nd) transmission. For example, in an embodiment, a specific inter-BSS beamformed frame is indicated in a PLCP preamble. In some embodiments, characteristics of the beamforming and/or null steering are indicated in the 1st transmission, some further example embodiments being illustrated below.

The 1st transmission may be a message, a frame, a protocol data unit (PDU), such as a PPDU, or a portion thereof preceding the 2nd transmission and comprising information on the 2nd transmission. The 1st transmission may comprise duration information on the 2nd transmission. The apparatus performing the method may be configured to determine duration of the 2nd transmission on the basis of the 1st transmission, and determine during the determined duration if the 2nd wireless device is allowed to transmit the 3rd transmission on the basis of the information on beamforming and/or null steering.

Figure 3:
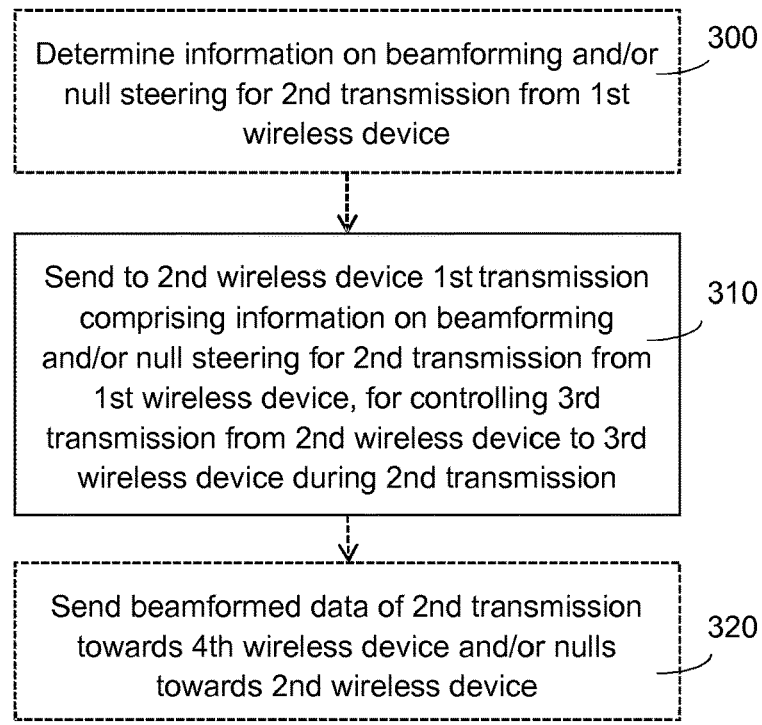

FIG. 3 illustrates a method for facilitating spatial reuse. The method may be performed in a 1st wireless device and by an apparatus controlling wireless transmission, such as the STA 10, the AP 22 or a controller thereof. The method may be carried out in a transmitting node sending beamforming and/or null steering information to a receiving node configured to perform the method of FIG. 2.

Block 300 comprises determining information on beamforming and/or null steering for 2nd transmission from a 1st wireless device. Block 300 may be entered and based on an input of an upper protocol layer for PDU transmission from AP1 to a 4$^{th}$ wireless device, such as the STA1, for example. There may be predetermined condition(s) for activating enhanced spatial reuse and thus entering block 300/310.

Block 310 comprises sending, from the 1st wireless device to a 2nd wireless device, a 1st transmission comprising information on beamforming and/or null steering for a 2nd transmission from the 1st wireless device. The information on beamforming and/or null steering is sent 310 for controlling a 3rd transmission from the 2nd wireless device to a 3rd wireless device during the 2nd transmission from the 1st wireless device.

Block 320 also illustrates sending of the 2nd transmission from the 1st wireless device. Thus, the 1st wireless device may transmit beamformed data towards the 4$^{th}$ wireless device and nulls towards the 2nd wireless device.

The methods of FIGS. 2 and 3 may be carried out in an apparatus comprised by the respective wireless device and configured to cause the wireless device to carry out at least the features disclosed. It is to be noted that in some embodiments an apparatus may be configured to cause performing of only block 310 of the method illustrated in FIG. 3.

The 1st wireless device may be an access node of a 1st wireless network and the 2nd wireless device may be a station of a 2nd wireless network, different from the 1st wireless network. In a further embodiment, the 1st and/or the 2nd wireless network is a wireless local area network, such as 802.11ax based network. The access node may be an access point. The 1st and/or 2nd wireless local area network may be associated with a basic service set.

Figure 4:
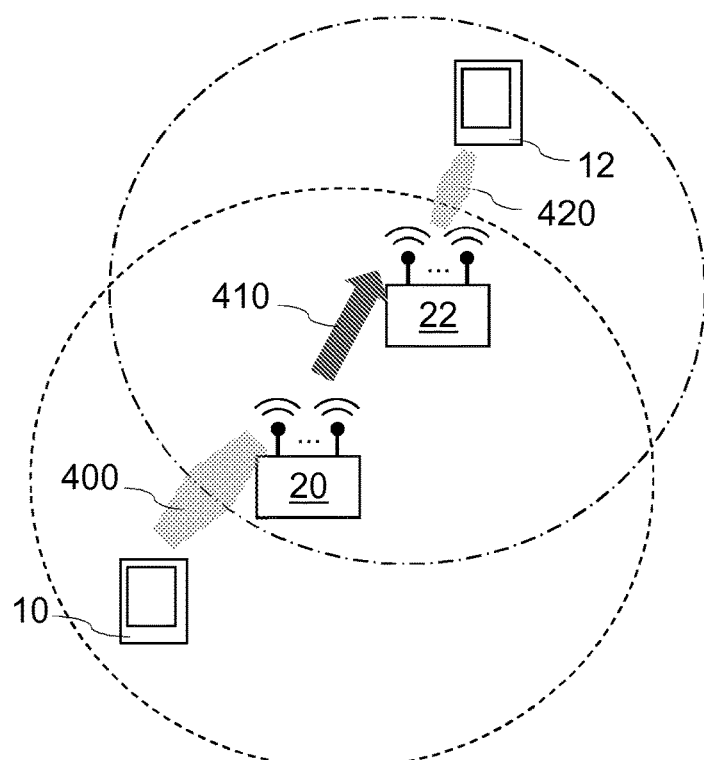
FIG. 4 illustrates spatial reuse in the system in accordance with at least some embodiments.

FIG. 4 illustrates an example of a data transmission stage employing spatial reuse. The AP 20 sends beamformed data 400 to the STA 10. The AP 20 also sends radiation nulls 410 placed towards direction(s) from which previous overlapping BSS transmissions have been detected, in the example towards the AP 22 (and also towards the STA 12). Furthermore, a 3rd transmission 420 from the AP 22 to the STA 12 is carried out on the basis of the information on null steering and beamforming received from the AP 20.

The 1st device may be configured to enter the block 300 and include the information on null steering and beamforming to enhance spatial reuse on the basis of the detected signal strengths levels. For example, the AP 20 may enter the block 300 on the basis of signal strength level reported by the STA 10, in response to detecting that the STA 10 has large received signal strength (exceeding a triggering threshold level).

Hence, an omnidirectionally sent 1st transmission does not anymore prevent neighbouring wireless devices to transmit during the 2nd transmission. Instead, the wireless device may now receive information based on the 1st transmission, such as the 802.11 PLCP preamble, that it may be possible to transmit during the subsequent 2nd transmission, and may be further control the channel access during the 2nd transmission based on the information in the 1st transmission. The present features facilitate to take further advantage of the interference mitigation and resulting channel access opportunities provided by beamforming and/or null steering during the subsequent data transmission to further enhance spatial reuse. Enhanced spatial reuse facilitates improved latency and data throughput.

Figure 5:
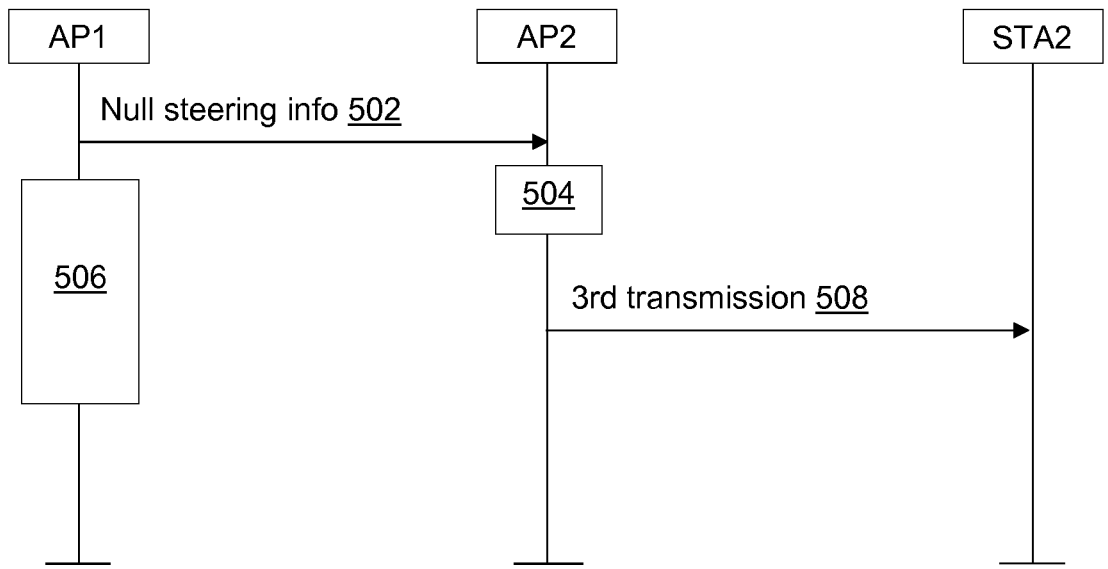
FIGS. 5 and 6 illustrate signalling examples in accordance with at least some embodiments.

In some embodiments, the information on beamforming and/or null steering comprises null steering information. With reference to the example of FIG. 5, the omnidirectional 1st transmission 502 from the 1st wireless device, e.g. the AP1, comprises an information element comprising null steering information. Based on the null steering information received from the AP1, the 2nd wireless device, e.g. the AP2, is configured to control 504 the 3rd transmission and to determine if the 3rd transmission 508 to the STA2 during the 2nd transmission 506 of the AP1 is enabled or not.

The null steering information 200, 310, 502 may indicate number of beams and/or number of null radiation nulls transmitted by the 1st wireless device during the 2nd transmission in the information on beamforming and/or null steering. Null is an area or vector or direction in antenna's radiation pattern where the transmitted signal cancels out, i.e. is not causing significant interference e.g. to reception of other signals.

A threshold value for the number of beams and/or nulls may be defined in the 2nd wireless device. Thus, the 3rd transmission 508 may be enabled 504 during the 2nd transmission 506 in response to the number of beams and/or null radiation nulls indicated in the received information 502 exceeding the threshold value(s). In case the threshold value is not exceeded, the 2nd wireless device may reject or prevent the 3rd transmission during the 2nd transmission 506.

In some embodiments, the null steering information 502 indicates a target area or direction of null radiation nulls (of or) during the 2nd transmission 506. Thus, the AP2 in the example of FIG. 5 may be configured to determine on the basis of the target area or direction information received from the AP1 if it is located in the target area or direction of transmitted nulls (410). The 3rd transmission 508 is then controlled 504 on the basis of the received null direction or target area information. The 3rd transmission 508 may be enabled 504 during the 2nd transmission 506 in response to detecting the 2nd wireless device located in the target area or direction of the nulls; otherwise the 3rd transmission may be prevented.

The null steering information 502 may indicate at least one target of null radiation nulls by indicating identifier(s) of wireless devices being nulled. For example, the AP1 may send the addresses of the nulled AP(s) (AP2) and/or STA(s) (STA2) in 502. The 3rd transmission 508 may then be controlled 504 on the basis of the identifier(s), i.e. if the AP2 is the target of the null radiation nulls or not. If it is identified, the 3rd transmission 508 may be enabled. In other example as above, the AP1 may additionally or instead send information on one or more directions on which the 2nd transmission cancels out.

Target area or direction of the beamformed data transmission 400 may be indicated in the 1st transmission 200, 310. Thus, the second wireless device may determine on the basis of this indication whether it is in the target area or direction. If not, it may enable the 3rd transmission; otherwise the 3rd transmission is prevented. The target area or direction of the beamformed data transmissions may be used as additional or alternative information for determining 504 whether the 3rd transmission 508 is enabled or prevented.

In some embodiments, signal detection threshold, such as the SD in 802.11 based networks, is adaptable and adapted in response to the received information on beamforming and/or null steering 200. This enables to have a channel access rule with adaptive signal detection threshold that can be tuned according to the beamforming/null steering characteristics of the 1st transmission.

In an example embodiment, the signal detection threshold is adapted on the basis of a least one of the number of beams, the number of null radiation nulls, and/or the target (e.g. device identifier, area or direction) of null radiation nulls in the received null steering information. For example, the larger the number of radiation nulls placed by the transmitter, the larger the signal detection threshold should be at the receiver, since there exists a greater likelihood of having channel access opportunities during the non-omnidirectional 2nd transmission. Complementarily, if the wireless device determines based on the received null steering information that radiation nulls have been specifically steered towards it, a very large SD threshold could be used. As a result of such channel access rule, the chances of concurrent transmission increases, taking advantage of the interference suppression provided in some space directions due to beamforming and/or null steering.

Figure 6:
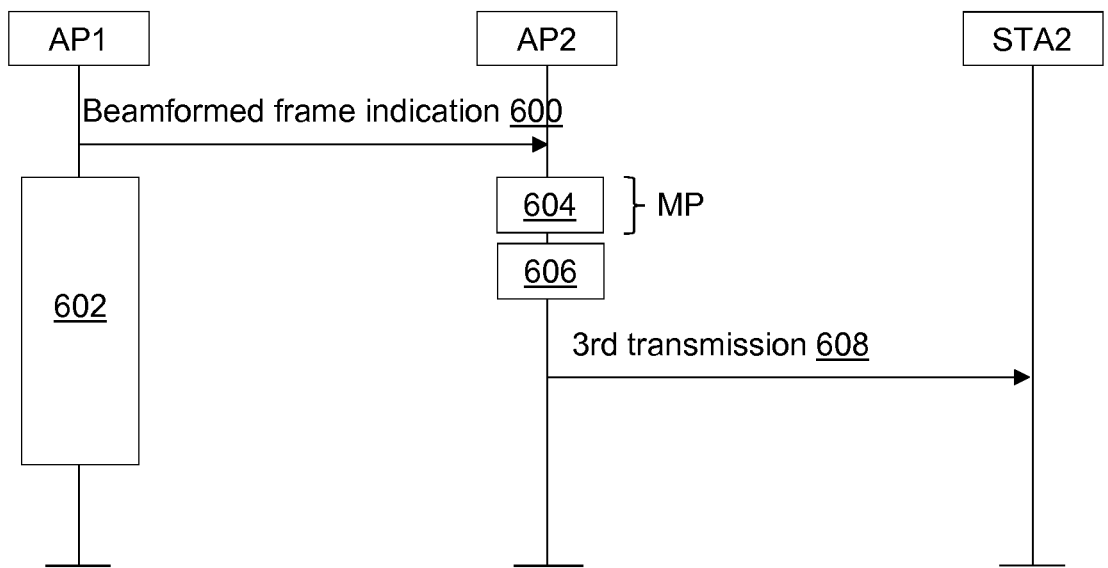

With reference to FIG. 6, the information on beamforming and/or null steering may indicate beamforming for the 2nd transmission and comprise a beamformed frame indication 600.

In response to detecting the beamformed frame indication 600 from the AP1, the AP2 is controlled to initiate an associated specific channel access rule. In some embodiments, the AP2 is, in response to the indication 600, configured to measure 604 the channel during the 2nd transmission 602. The AP2 may be configured to begin measuring 604 power (/energy) instantly in the beginning of the 2nd transmission 602 and continue measuring for a predefined measuring period (MP), i.e. during a 1st or start period of the 2nd transmission 602.

In another embodiment, the AP2 is configured to measure power during the omnidirectional 1st transmission. Thus, the AP2 initiates measurement in the beginning of or during the time period applied for transmitting the indication 600 and block 604 may be replaced by block 606. In a still further embodiment, the AP2 is configured to measure power during the 1st transmission 506 and the MP.

One or more conditions may be set for controlling 210, 606 the 3rd transmission during the 2nd transmission on the basis of the channel measurement result. A power threshold may be set for enabling or rejecting the 3rd transmission. Thus, information on received energy during the 1st transmission and/or the MP may be compared to at least one energy detection (ED) threshold, for example. If the power measured 604 during the 1st transmission and/or the MP does not exceed the threshold(s), applied on the basis of the received information on beamforming and/or null steering, the 3rd transmission 608 is enabled during the 2nd transmission 602. When the MP is applied, the 3rd transmission is enables after the 1st period MP and during a 2nd period of the 2nd transmission 602. If the measured power exceeds the threshold, the 3rd transmission may instead be rejected in block 606 for the remaining duration of the 2nd transmission 602.

In case the 3rd transmission is rejected in 210, 504, 606, the AP2 may continue with channel access procedure applied for omnidirectional transmissions, such as the carrier sense protocol applied in the respective inter-BSS frames. AP2 may set a timer for the duration of the 2nd transmission 506, 602, and control the 3rd transmission after expiry of the timer.

It is to be noted that the above illustrates only some embodiments of the information on beamforming and/or null steering and application thereof. For example, instead of an access point (AP2), a station, e.g. the STA2, may operate as the 2nd wireless device, and an access point may operate as the 3rd wireless device instead of STA2. There may be other information included in the 1st transmission 200, 310, affecting the control 210 of the 3rd transmission from the 2nd wireless device, instead of or in addition to the embodiments illustrated above.

The first transmission may be an omnidirectionally-transmitted frame or a frame portion and the 2nd transmission a non-omnidirectionally transmitted frame or a frame portion. With reference to the simplified example of FIG. 7, in some embodiments the 1st transmission comprises an omnidirectionally-transmitted preamble PRA of a physical layer protocol data unit. The 2nd transmission comprises the remaining portion (separated from the PRA by the solid line) of the PDU, herein referred to as beamformed PDU portion BFPDU, comprising the beamformed data. The information on beamforming and/or null steering may be included in a new or an existing field 700 of the PRA.

In some embodiments, the PDU is a PPDU for IEEE802.11 based networks, and the information on beamforming and/or null steering is included in a preamble field of 802.11 PPDU.

A new frame type may be defined for a PDU, such as the 802.11 PPDU, comprising the information on beamforming and/or null steering. A receiver of the preamble with the information on beamforming and/or null steering may classify the 2nd transmission as an inter-BSS beamformed frame, instead of an (ordinary) intra-BSS frame or intra-BSS frame. Thus, an 802.11 station may be configured to determine whether to back off depending on the received signal strength of the PLCP preamble, the type of the frame, and the SD threshold defined for such frame type.

In some embodiments, the wireless devices are Extremely High Throughput (EHT) devices. EHT is currently discussed in an IEEE 802.11 EHT topic interest group (TIG) to initiate discussions on new 802.11 features for bands between 1 and 7.125 GHz. The EHT's primary objective is to increase peak throughput and cell efficiency as well as to reduce latency to support high throughput and low latency applications, such as video-over-WLAN, augmented reality (AR) and virtual reality (VR). Such EHT devices may apply more spatial streams, increased bandwidth, and multiband switching, aggregation and operation.

New EHT-specific data may be included in the omnidirectionally-transmitted EHT preamble, to allow an EHT device that uses beamforming and/or null steering in the PPDU transmission to indicate use of beamforming and/or null steering. Other EHT devices may use this new data in the EHT preamble of a received PPDU in the frame classification. The EHT preamble may comprise the null steering information as indicated above, such as the number of radiation nulls and/or direction or target area of the nulls.

An EHT device applying the method illustrated in connection with FIG. 6, such as the AP 22 of FIG. 4, after receiving an inter-BSS PPDU with the "beamformed frame" field set, can ignore both the information relevant for determining the duration of the PPDU in the received omnidirectional EHT preamble and the basic NAV information if the power measured during the beamformed part of the PPDU (e.g., the MPDU) is below a predetermined inter-BSS beamformed frame threshold, for example y=−2 dBm). Thus, the EHT device may proceed with data transmission ignoring the information received in the omnidirectional EHT preamble of the received PPDU, since it detected that a) the PPDU is an inter-BSS beamformed frame allowing spatial reuse due to the "beamformed frame" bit, and b) the radiation nulls are accurately placed, resulting in the power measured not exceeding the inter-BSS beamformed frame threshold.

A new EHT-specific field for the information on beamforming and/or null steering, herein referred to as a "beamformed frame" field, may be introduced into the omnidirectionally-transmitted EHT preamble of the PPDU to determine that a transmitted frame is beamformed. The inter-BSS beamformed frame may be specified as a subclass of inter-BSS EHT frames. A transmitting device sets this field to a value that represents beamformed PPDU when beamforming is used, and a receiving wireless device leverages this bit to determine whether a received inter-BSS frame is an inter-BSS beamformed frame or not.

In an embodiment, the "beamformed frame" field is built into a spatial reuse field of a HE-SIG-A field of a HE preamble. The HE preamble and the HE-SIG-A field may be specified as illustrated in the example of FIG. 8. The HE-SIG-A field may contain two parts, HE-SIG-A1 and HE-SIG-A2, and the Spatial Reuse field may be a four-bit (B15-B18) field in the HE-SIG-A1, with the encoding as indicated in FIG. 9. One of the 12 reserved values, e.g. 1, may be used to indicate "beamformed frame". Alternatively, a new preamble field like the RL-SIG or the HE-SIG-A fields may be defined for EHT PPDUs with a subfield to indicate whether the PPDU is transmitted with beamforming and/or null steering.

While some embodiments have been described in the context of IEEE 802.11 based systems, it should be appreciated that these or other embodiments of the invention may be applicable in connection with other technologies configured to operate on licensed or non-licensed band, such as with wireless devices operating according to other versions of the IEEE 802.11, WiMAX (Worldwide Interoperability for Microwave Access), 3GPP LTE (Long-term Evolution for Universal Mobile Telecommunication System), LTE-Advanced, or a fifth generation cellular communication system (5G).

An electronic device comprising electronic circuitries may be an apparatus for realizing at least some embodiments of the present invention. The apparatus may be or may be comprised in a computer, a laptop, a tablet computer, a cellular phone, a machine to machine (M2M) device (e.g. an IoT sensor device), a wearable device, a base station, access point device or any other apparatus provided with radio communication capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 10:
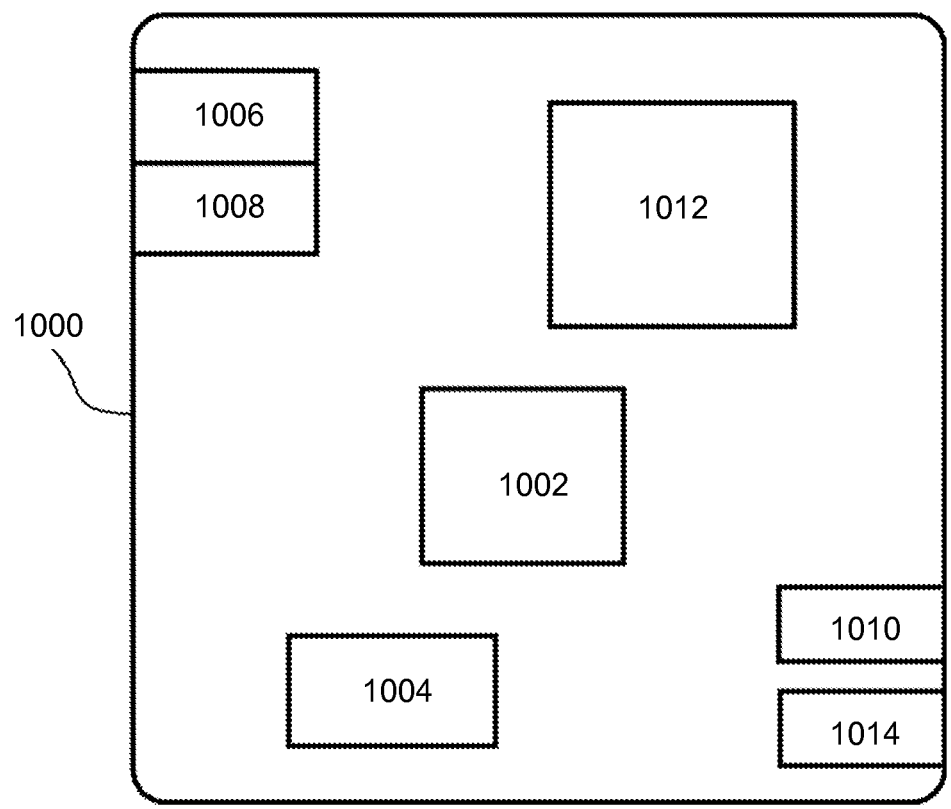
FIG. 10 illustrates an example apparatus capable of supporting at least some embodiments.

FIG. 10 illustrates an example apparatus capable of supporting at least some embodiments of the present invention. Illustrated is a device 1000, which may comprise a communications device arranged to operate as a WLAN STA 10, 12, 20, or 22, for example. The device may include one or more controllers configured to carry out operations in accordance with at least some of the embodiments illustrated above, such as some or more of the features illustrated above in connection with FIGS. 2 to 9. The device may be configured to operate as the apparatus configured to carry out the method of FIGS. 2 and/or 3, for example.

Comprised in the device 1000 is a processor 1002, which may comprise, for example, a single- or multi-core processor wherein a single-core processor comprises one processing core and a multi-core processor comprises more than one processing core. The processor 1002 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

The device 1000 may comprise memory 1004. The memory may comprise random-access memory and/or permanent memory. The memory may comprise at least one RAM chip. The memory may comprise solid-state, magnetic, optical and/or holographic memory, for example. The memory may be at least in part accessible to the processor 1002. The memory may be at least in part comprised in the processor 1002. The memory 1004 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 1000 but accessible to the device. For example, control parameters affecting operations related to the providing of and/or actions based on the information on beamforming and/or null steering may be stored in one or more portions of the memory and used to control operation of the apparatus. Further, the memory may comprise device-specific cryptographic information, such as secret and public key of the device 1000.

The device 1000 may comprise a transmitter 1006. The device may comprise a receiver 1008. The transmitter and the receiver may be configured to transmit and receive, respectively, information in accordance with at least one wired or wireless, cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 5G or other cellular communications systems, WLAN, and/or Ethernet standards, for example. The device 1000 may comprise a near-field communication, NFC, transceiver 1010. The NFC transceiver may support at least one NFC technology, such as NFC, Bluetooth, Wibree or similar technologies.

The device 1000 may comprise user interface, UI, 1012. The UI may comprise at least one of a display, a keyboard, a touchscreen, a vibrator arranged to signal to a user by causing the device to vibrate, a speaker and a microphone. A user may be able to operate the device via the UI, for example to accept incoming telephone calls, to originate telephone calls or video calls, to browse the Internet, to manage digital files stored in the memory 1004 or on a cloud accessible via the transmitter 1006 and the receiver 1008, or via the NFC transceiver 1010, and/or to play games.

The device 1000 may comprise or be arranged to accept a user identity module or other type of memory module 1014. The user identity module may comprise, for example, a subscriber identity module, SIM, and/or a personal identification IC card installable in the device 1000. The user identity module 1014 may comprise information identifying a subscription of a user of device 1000. The user identity module 1014 may comprise cryptographic information usable to verify the identity of a user of device 1000 and/or to facilitate encryption and decryption of communication effected via the device 1000.

The processor 1002 may be furnished with a transmitter arranged to output information from the processor, via electrical leads internal to the device 1000, to other devices comprised in the device. Such a transmitter may comprise a serial bus transmitter arranged to, for example, output information via at least one electrical lead to memory 1004 for storage therein. Alternatively to a serial bus, the transmitter may comprise a parallel bus transmitter. Likewise the processor may comprise a receiver arranged to receive information in the processor, via electrical leads internal to the device 1000, from other devices comprised in the device 1000. Such a receiver may comprise a serial bus receiver arranged to, for example, receive information via at least one electrical lead from the receiver 1008 for processing in the processor. Alternatively to a serial bus, the receiver may comprise a parallel bus receiver.

The device 1000 may comprise further devices not illustrated in FIG. 10. For example, the device may comprise at least one digital camera. Some devices may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 1010 and/or the user identity module 1014.

The processor 1002, the memory 1004, the transmitter 1006, the receiver 1008, the NFC transceiver 1010, the UI 1012 and/or the user identity module 1014 may be interconnected by electrical leads internal to the device 1000 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or functional features may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in wireless communications.

| ACRONYMS LIST | |
|---|---|
| 3GPP | Third Generation Partnership Project |
| AP | Access point |
| ASIC | Application-specific integrated circuit |
| BSS | Basic service set |
| CCA | Clear channel assignment |
| CSMA | Carrier sense multiple access |
| EHT | Extremely high throughput |
| ESS | Extended service set |
| FPGA | Field-programmable gate array |
| GSM | Global system for mobile communication |
| LTE | Long term evolution |
| M2M | Machine to machine |
| MPDU | MAC protocol data unit |
| NAV | Network allocation vector |
| NFC | Near-field communication |
| NMS | Network management system |
| PLCP | Physical layer convergence protocol |
| PPDU | PLCP protocol data unit |
| STA | Station |
| UI | User interface |
| WCDMA | Wideband code division multiple access |
| WiMAX | Worldwide interoperability for microwave access |
| WLAN | Wireless local area network |

The invention claimed is:

1. An apparatus comprising
at least one processor,
at least one memory storing instructions, that when executed by the at least one processor, cause the apparatus at least to:
receive from a first wireless device a first transmission comprising information on at least one of beamforming or null steering for a second transmission from the first wireless device,
wherein the first transmission comprises an omnidirectionally-transmitted preamble field of a physical layer protocol data unit to identify whether the second transmission is beamformed or null steered, and
wherein the information on at least one of beamforming or null steering comprises parameters indicative of at least one target area or direction of at least one null radiation null during the second transmission; and enable, based on the information, a third transmission from a second wireless device to a third wireless device during the second transmission on the basis of the information on at least one of beamforming or null steering, wherein the second transmission comprises a remaining frame or preamble portion of the physical layer protocol data unit.

2. The apparatus of claim 1, wherein the at least one memory is storing instructions, that when executed by the at least one processor, further cause the apparatus to:

determine a duration of the second transmission on the basis of the first transmission, and determine during the determined duration if the second wireless device is allowed to transmit the third transmission on the basis of the information on at least one of beamforming or null steering.

3. The apparatus of claim 1, wherein the at least one memory is storing instructions, that when executed by the at least one processor, further cause the apparatus to:

in response to detecting the information on at least one of beamforming or null steering, measure by the second wireless device power received during at least one of the first transmission or a first period of the second transmission, and control the third transmission during the second transmission on the basis of the measured power.

4. The apparatus of claim 1, wherein the information on at least one of beamforming or null steering comprises parameters indicative of at least one target area or direction of at least one null radiation null during the second transmission and the at least one memory is storing instructions, that when executed by the at least one processor, further cause the apparatus to:

determine on the basis of the information on at least one of beamforming or null steering if the second wireless device is located in a target area or direction of the at least one target area or direction, and enable the third transmission during the second transmission in response to detecting the second wireless device located in the target area or direction.

5. The apparatus of claim 1, wherein the information on at least one of beamforming or null steering indicates at least one of a number of beams or a number of null radiation nulls during the second transmission and the at least one memory is storing instructions, that when executed by the at least one processor, further cause the apparatus to enable the third transmission during the second transmission in response to at least one of the number of beams or the number of null radiation nulls exceeding a threshold value.

6. The apparatus of claim 1, wherein the at least one memory is storing instructions, that when executed by the at least one processor, further cause the apparatus to adapt a signal detection threshold on the basis of the information on at least one of beamforming or null steering.

7. The apparatus of claim 1, wherein the first wireless device is an access node of a first wireless network and the second wireless device is a station of a second wireless network, different from the first wireless network.

8. The apparatus of claim 1, wherein at least one of the first wireless device or the second wireless device is a station or an access point of a wireless local area network and the information on at least one of beamforming or null steering is included in a preamble field of the physical layer protocol data unit.

9. The apparatus of claim 1, wherein the at least one target area or direction is indicated by an identifier of a device to be nulled.

10. The apparatus of claim 1, wherein the omnidirectionally-transmitted preamble field is incorporated in a spatial reuse field.

11. An apparatus comprising
at least one processor,
at least one memory storing instructions, that when executed by the at least one processor, cause the apparatus at least to:

send, from a first wireless device to a second wireless device, a first transmission comprising information on at least one of beamforming or null steering for a second transmission from the first wireless device, wherein the first transmission comprises an omnidirectionally-transmitted preamble field of a physical layer protocol data unit to identify whether the second transmission is beamformed or null steered, and wherein the information on at least one of beamforming or null steering comprises parameters indicative of at least one target area or direction of at least one null radiation null during the second transmission, and enabling, based on the information, a third transmission from the second wireless device to a third wireless device during the second transmission from the first wireless device, wherein the second transmission comprises a remaining frame or preamble portion of the physical layer protocol data unit.

12. The apparatus of claim 11, wherein the at least one memory is storing instructions, that when executed by the at least one processor, further cause the apparatus to indicate in the information on at least one of beamforming or null steering at least one of number of null radiation nulls, at least one target area of at least one null radiation null, and direction of at least one null radiation null during the second transmission.

13. A method comprising:

receiving from a first wireless device a first transmission comprising information on at least one of beamforming or null steering for a second transmission from the first wireless device, wherein the first transmission comprises an omnidirectionally-transmitted preamble field of a physical layer protocol data unit to identify whether the second transmission is beamformed or null steered, and wherein the information on at least one of beamforming or null steering comprises parameters indicative of at least one target area or direction of at least one null radiation null during the second transmission; and enabling, based on the information, a third transmission from a second wireless device to a third wireless device during the second transmission on the basis of the information on at least one of beamforming or null steering, wherein the second transmission comprises a remaining frame or preamble portion of the physical layer protocol data unit.

14. The method of claim 13, further comprising: determining a duration of the second transmission on the basis of the first transmission, and determining during the determined duration if the second wireless device is allowed to transmit the third transmission on the basis of the information on at least one of beamforming or null steering.

15. The method of claim 13, further comprising: in response to detecting the information on at least one of beamforming or null steering, measuring by the second wireless device power received during at least one of the first transmission or a first period of the second transmission, and controlling the third transmission during the second transmission on the basis of the measured power.

16. The method of claim 13, wherein the information on at least one of beamforming or null steering comprises parameters indicative of at least one target area or direction of at least one null radiation null during the second transmission, the method further comprising: determining on the basis of the information on at least one of beamforming or null steering if the second wireless device is located in a target area or direction of the at least one target area or direction, and enabling the third transmission during the second transmission in response to detecting the second wireless device located in the target area or direction.

17. The method of claim 13, wherein the information on at least one of beamforming or null steering indicates at least one of a number of beams or a number of null radiation nulls during the second transmission and the third transmission is enabled during the second transmission in response to at least one of the number of beams or the number of null radiation nulls exceeding a threshold value.

18. The method of claim 13, further comprising adapting a signal detection threshold on the basis of the information on at least one of beamforming or null steering.

19. The method of claim 13, wherein the first wireless device is an access node of a first wireless network and the second wireless device is a station of a second wireless network, different from the first wireless network.

20. The method of claim 13, wherein at least one of the first wireless device or the second wireless device is a station or an access point of a wireless local area network and the information on at least one of beamforming or null steering is included in a preamble field of the physical layer protocol data unit.

* * * * *